July 14, 1970    J. F. SCHARF    3,520,178
METHOD AND APPARATUS FOR DETECTING A SPLIT CLOSURE CURL
Filed Oct. 31, 1968    2 Sheets-Sheet 1

United States Patent Office 3,520,178
Patented July 14, 1970

3,520,178
METHOD AND APPARATUS FOR DETECTING A SPLIT CLOSURE CURL
Jerry F. Scharf, Havertown, Pa., assignor to Crown Cork & Seal Company, Inc., Philadelphia, Pa., a corporation of Pennsylvania
Filed Oct. 31, 1968, Ser. No. 772,089
Int. Cl. G01m 3/04
U.S. Cl. 73—49.2     14 Claims

ABSTRACT OF THE DISCLOSURE

Detection of a split curl on an aerosol can end by engaging a round portion on the crest of the curl with an annular central sealing member and engaging the side of the curl with an annular peripheral sealing member; introducing fluid into a chamber defined by the curl, the central sealing member, and the peripheral sealing member in response to movement of the central sealing member and the peripheral sealing member; and sensing any leakage which may occur from that chamber through a split or fissure in the curl and an adjacent out-of-round portion.

BACKGROUND OF THE INVENTION

The invention relates to the detection of defective closures, and more particularly, the invention relates to the detection of split or cracked closure curls.

In certain types of closures for cans, it is a common practice to provide a curl along a lip edge. For example, it is customary in an aerosol can end to provide a curl along the inside circumferential edge. During a manufacturing process which may include drawing, irregularities can develop along the curled edge in the form of nicks or burrs. If the edge is curled radially outwardly, the edge will be subjected to tangential strain at the irregularities. This tangential strain may result in fissures due to the cracking or splitting of the curls at the irregularities.

Although a leak in any closure is undesirable, it is intolerable in the case of an aerosol can since even a minute opening will permit escape of the all-important propellant. Consequently, it is desirable that any aerosol can end which has a leakage potential be detected and rejected. It has been found that even a cracked curl has a very great leakage potential.

The conventional approach to detecting a hole in a closure involves the application of fluid under pressure to a chamber defined in part by the closure and one or more sealing members. If there is a hole in the closure, its presence may be detected by observing fluctuations of pressure in the chamber due to the escape of fluid through the closure hole. If the closure hole is sufficiently large, the fluid which escapes is substantial and the fluctuation in pressure is readily detected. However, if the closure hole is quite small, such as the split or fissure of a cracked curl, the fluid which escapes is negligible and detection of the fluctuation in pressure requires very sensitive means.

In fact, fluid leakage through some narrow fissures is almost undetectable, and the out-of-round geometry of the split curl must be relied on for detection of the defective curl. Consequently, the prior art techniques for detecting defective closures, such as clipped can ends, by sensing fluid leakage through a hole in the container are unsuitable for detecting split curls. Furthermore, these techniques are not suitable since they rely upon forming seals on opposite surfaces of the curled lip and at one edge. In the case of aerosol can ends, one surface is almost completely inaccessible and the edge may be relatively inaccessible.

The prior art techniques are also unreliable for detecting split curls since detection of negligible fluid leakage through a fissure or along the out-of-round curl requires the use of very sensitive detecting means capable of detecting small pressure fluctuations and therefore demanding almost perfect seals between a good curl and the sealing members. The prior art has utilized relatively fixed sealing members which will not conform to the tolerances along curls and will therefore produce small leaks along the good curls capable of improperly triggering the very sensitive detecting means. In addition, the prior art has introduced fluid prior to formation of seals between the closure and the sealing members resulting in momentary fluid leakage which will improperly trigger the very sensitive detecting means.

SUMMARY OF THE INVENTION

It is one object of the invention to detect very narrow fissures in split curls.

It is another object of the invention to detect very narrow fissures in split curls with reliability.

It is a further object of the invention to detect very narrow fissures in split curls without necessarily relying upon fluid leakage through the fissure itself.

It is a still further object of the invention to detect very narrow fissures in split curls even where an edge and one surface of the curl are relatively inaccesible.

In accordance with the invention, detection of the fissure in a split curl outwardly of and below the crest of the curl is accomplished by engaging a substantially round portion of the curl with a first arcuate sealing member and forming an arcuate seal therealong and engaging an out-of-round portion of the curl with a second arcuate sealing member and forming leakage gaps in addition to the fissure therealong. Fluid is then introduced into a chamber defined at least in part by the surface of the curl and the first and second sealing members and leakage through the gaps is detected.

In the preferred embodiment of the invention, a piston assembly including a central sealing member and a sleeve-like peripheral sealing member is spring biased to an extended position in a housing. The central sealing member is adapted to engage the crest of the curl while the peripheral sealing member is adapted to engage the side of the curl to form a chamber. If the curl is good, a fluid introduced into the chamber will be retained therein under pressure. If the curl is split or cracked, the fluid will leak out along the out-of-round portion of the curl adjacent the fissure and the pressure of the fluid will drop. This drop may then be detected by sensing means.

DESCRIPTION OF THE PREFERRED EMBODIMENT

Figure 1:
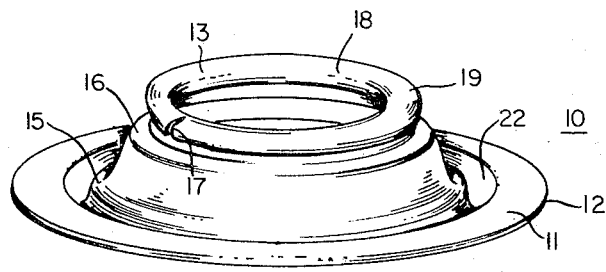
FIG. 1 is a perspective view of an aerosol can end with a split curl.
Figure 2:
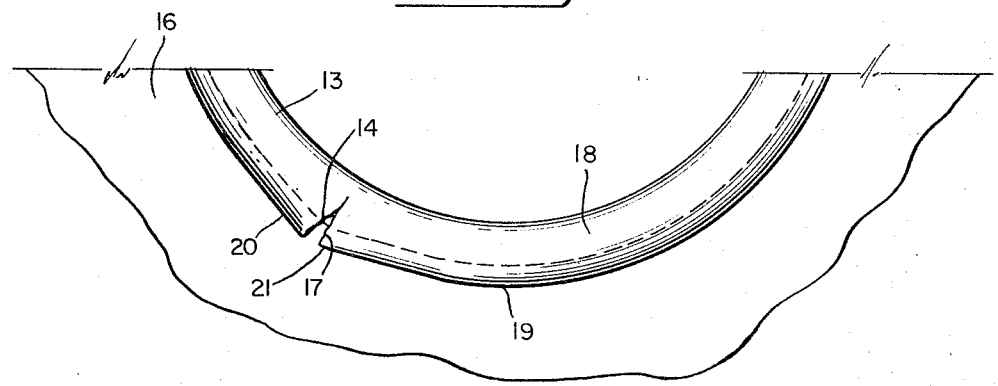
FIG. 2 is a partial plan view of the split curl.

In FIGS. 1 and 2, there is disclosed a closure in the form of an aerosol can end 10. The end 10 comprises a flange 11 at the can-engaging edge 12, an outwardly and downwardly extending curl 13 at the central edge 14, a pair of ridges 15 and 16, and a groove 22 between the flange 11 and the ridge 15. During the formation of the illustrated defective end 10, the curl 13 has split resulting in a fissure 17 extending outwardly from the crest 18, down the side 19, to the edge 14 of the curl 13.

Although the fissure 17 is shown as exaggerated in size for illustrative purposes, it is in most cases rather narrow. As mentioned previously, it is usually so narrow as to render detection of fluid leakage through the fissure 17 itself impractical. However, the fissure 17 does produce a coincident deformity in the curl 13 which permits detection. In particular, the fissure 17 results in an out-of-round portion or bulging along the side 19 at surfaces 20 and 21.

Figure 3:
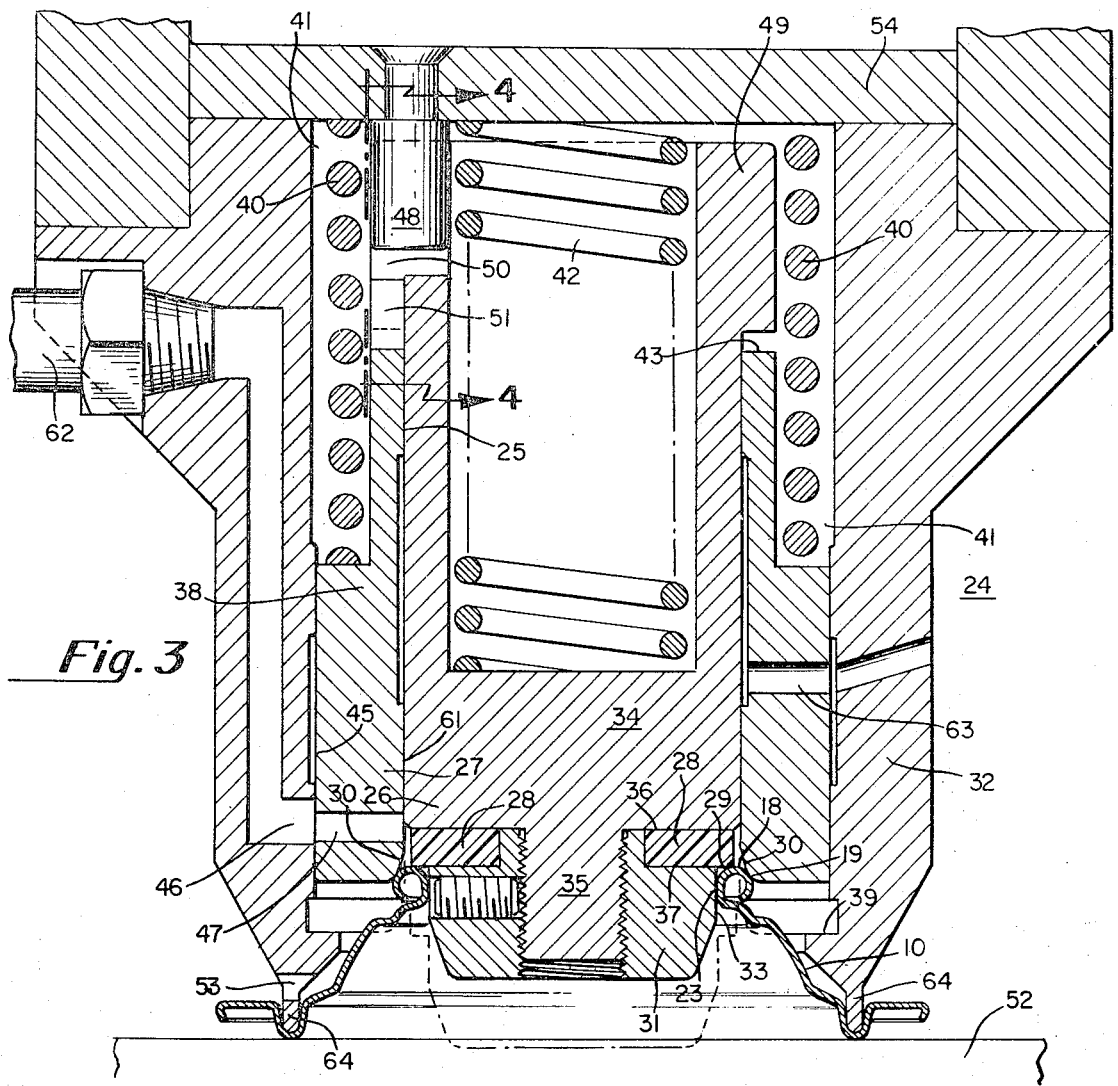
FIG. 3 is a cross-sectional view of a split curl detecting head.

An apparatus for detecting the bulging surfaces 20 and 21 characteristic of the split curl 13 is shown in FIG. 3. The apparatus comprises a detector head 24 which includes a piston assembly 25 having a first or central sealing member 26 and a sleevelike second or peripheral sealing member 27. In order to engage a round portion of the curl 13 along the crest 18, the first sealing member 26 comprises a sealing disc 28 having an arcuate or annular sealing surface 29 which will form a seal. In order to engage the out-of-round portion of the curl 13 outwardly of and below the crest 18, the second sealing member 27 includes an arcuate or annular side sealing surface 30. Due to the out-of-round nature of the side 19 at the bulging surfaces 20 and 21, an imperfect seal will be established by the side sealing surface 30 and leakage gaps adjacent the fissure 17 along the curl 13 will result. Fluid pressure drops caused by fluid leakage through the gaps may then be detected.

To assure proper alignment of the detector head 24 with the can end 10, the first sealing member 26 includes a centering button 31 which will make initial contact with the can end 10 as the head 24 approaches the end 10. Accordingly, the centering button 31 includes an annular surface 33 for engaging a central portion 23 of the curl 13. The button 31 of the first sealing member 26 threadedly engages its end post 35 and serves to clamp the sealing disc 28 in an appropriate position by sandwiching the disc 28 between a shoulder 36 of a central plunger 34 and a shoulder 37 of the centering button 31. While the sealing disc 28 may be relatively soft so as to effect a good seal at the crest or central portion of the curl, it is essential that the side sealing surface 30 of the second sealing member or sleeve 27 be relatively hard so as to provide a nonconforming surface for engaging the out-of-round side 19 of the curl.

In accordance with one important aspect of the invention, a dual valve action is provided by the movable piston assembly 25 to guard against extraneous fluid leakage which could erroneously trigger a sensitive fluid pressure sensing means. For this purpose, the entire piston assembly 25 is spring biased to the extended position at the open end of the housing 32. More particularly, the sleeve member 27 is biased for engagement with a housing flange 39 by the helical spring 40 disposed in an annular chamber 41 formed by the housing 32, its top plate 54, and the movable sealing members 26 and 27. The first sealing member 26 is also biased by a second helical spring 42 for engagement with a stop 43 of the sleeve member 27.

As may be seen by reference to the phantom position of the first sealing member 26 and the second sealing member 27 of FIG. 3, the helical spring 42 forces the first sealing member 26 forward with respect to the second sealing member 27 to provide a valve action which limits premature and extraneous leakage thereby raising the reliability of the detector. When the first sealing member 26 is retracted with respect to the second sealing member 27 in response to engaging the curl 13, a valve surface 61 of the first sealing member 26 opens one end of a passageway 47 in the second sealing member 27. Note that the relative axial movement between the first sealing member 26 and the second sealing member 27 also permits the detector head 24 to accommodate variations in curl sizes. This assures a good seal on all curls thereby further limiting extraneous leaks and further increasing the reliability of the detector.

The second sealing member 27 also provides a valve action along an outer surface 45. When the second sealing member 27 is spring biased to the forward position, the surface 45 will block the passageway 46 in the housing 32 from a fluid coupling means 62. When the second sealing member 27 engages the curl 13 and moves to the retracted position shown, the valve means is opened by alignment of the passageways 46, 47 respectively in the housing 32 and the sleeve 26.

Figure 4:
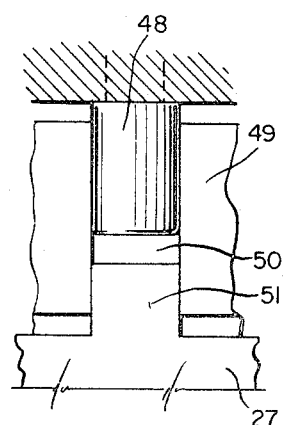
FIG. 4 is a cross-sectional view taken along section lines 4—4 of FIG. 3.

To maintain alignment of the passageway 47 with the passageway 46, the top plate 54 may be provided with one or more guide pins 48 (FIG. 4). A channel 50 in the upper end 49 of the plunger 34 slidably receives the guide 48 to minimize any rotational movement of the plunger 34. A projection 51 of the second sealing member 27 is slidably received by the channel 50 to minimize its rotational movement. The result is that the passageway 47 is always radially aligned with the passageway 46 although mutual relative axial movement is permitted. Axial movement of the first sealing member 26 and the second sealing member 27 relative to each other and to the housing 32 is facilitated by a lubricant applied through passageways 63 in the housing 32.

The method of detecting split curls by forming a fluid testing chamber defined by the curl 13 and the head 24 is as follows. Prior to engagement of the can end 10, the piston assembly 25 is in the extended position as shown in phantom with the housing 32 spaced above the can end 10 and its temporary support 52. As shown, the second sealing member 27 rests on the flange stop 39 of the housing when the piston assembly 25 is extended. As the head 24 is lowered toward the can end 10 to be tested, the surfaces 33 of the centering button 31 will engage the central portion 23 of the curl 13 to align the end 10 under the head 24 and the valve surface 61 of plunger 34 will open the inner end of the passageway 47. The initial engagement of the sealing surfaces is made by the sealing surface 29 which engages the crest 18 of the curl while the centering button 31 bears on the central portion 23 of the curl 13. The continuing movement of the head 24 toward the end 10 results in the continuing movement of the first sealing member 26 relative to the housing 32 and the second sealing member 27. Subsequently, the sealing surface 30 of the sleeve 27 will engage the side 19 of the curl 13 to form a testing chamber defined in part by the first sealing member 26, the second sealing member 27, and the convex surface of the curl 13. Thereafter for continued downward movement of the head 24, the outer end of the passageway 47 through the second sealing member 27 is brought into communication with the passageway 46 of the housing 32. Since fluid is supplied to the testing chamber only after it has been formed, there will be no premature application of fluid to the chamber prior to formation of curl seals at the sealing surfaces 29 and 30. These chamber-completing seals at the relatively movable sealing surfaces 29 and 30 along the crest 18 and the side 19 of the curl are made prior to application of the fluid to the chamber. Finally, an annular projection 64 of the housing 32 engages the annular groove 22 of the can end 10.

If the curl 13 is not split, the fluid applied to the chamber will be confined and the testing fluid will remain under constant pressure. If the curl 13 is split, the fluid applied to the chamber will escape, primarily through leakage gaps along the side 19, and out an aperture 53 in the annular projection 64 of the housing 32. This escape of fluid through the gaps results in a detectable decrease in pressure within the chamber.

Figure 5:
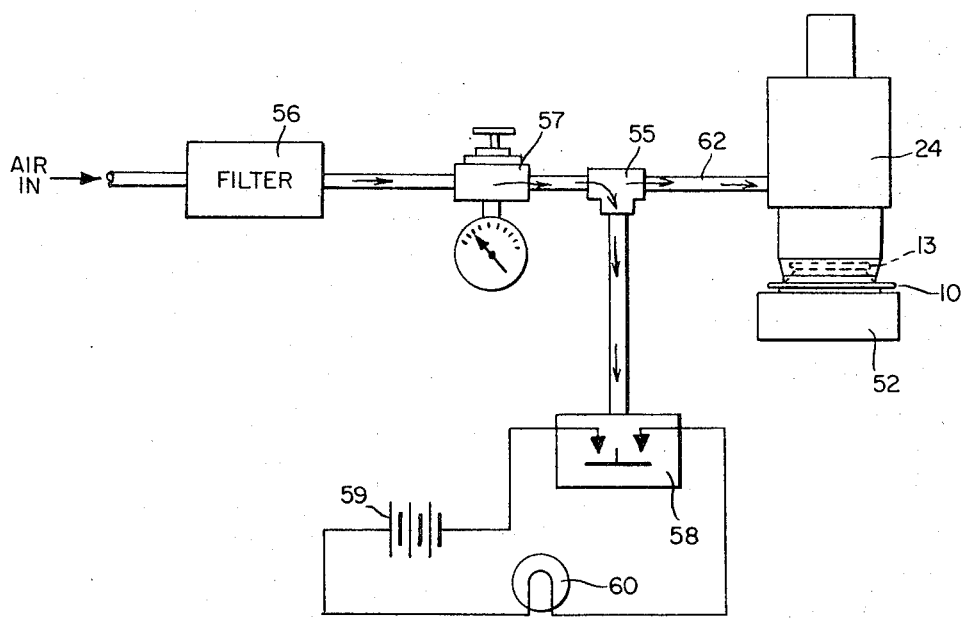
FIG. 5 is a schematic diagram of a split curl detecting system.

A system for applying fluid to the head 24 and detecting changes in pressure associated therewith is shown in FIG. 5. A fluid such as air is applied to an appropriately restricted orifice of a T fitting 55 through a series combination comprising a filter 56 and a gauge-valve 57. One parallel branch from the T fitting 55 is connected to the fluid coupling means 62 of the head 24 for applying air under pressure to the chamber defined in part, as above discussed, by the curl 13 of the can end 10. The other parallel branch from the T fitting 55 includes a sensitive pneumatic switch 58 which is responsive to a small drop in air pressure, i.e., two pounds per square inch, caused by air passing through the leakage gaps along the curl 13. When the switch 58 is open signalling the chamber is airtight, as in the case of a good curl, no current flows from the power supply 59 and the signalling means exemplified by a light bulb 60 is deactivated. When the switch 58 closes, as in the case of a split curl, current flows from the supply 59 to activate the bulb 60 so as to indicate the can end is defective.

Figure 6:
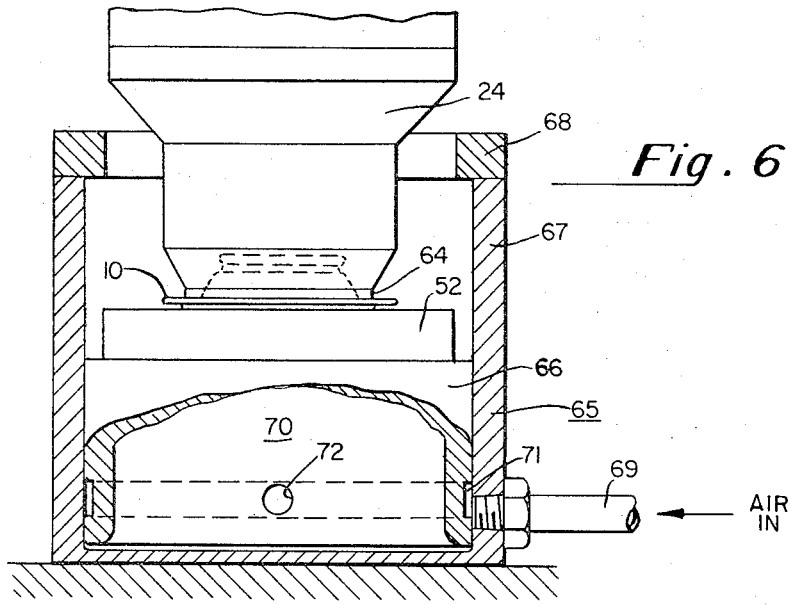
FIG. 6 is a plan view of the split curl detecting head of FIG. 3 in combination with an air shoe.

It may be desirable to utilize the detector in a multiple station press which is used for shaping the can end 10 and forming its curl 13. In such case, the testing head 24 may be mounted on a reciprocating head of a press over a yielding support in the form of an air shoe mounted on the base of the press. Such an air shoe 65, as shown in FIG. 6, comprises a piston 66 which is movable through a cylinder 67 as the head 24 bears directly upon the can end 10 and indirectly on the plate 52. Prior to engagement of the can end 10 by the head 24, the piston 66 is maintained in engagement with a sealing member 68 by air pressure in a chamber 70 derived from the application of air from supply line 69 to an otherwise closed chamber 70. As the head 24 is lowered for testing a previously formed can end 10, the annular projection 64 will transmit its movement to the piston 66 through the end 10 and its support 52 which is floating on a column of air. In order to permit the escape of fluid air as the piston 66 moves to the bottom of the cylinder 65, the piston 66 includes an annular passageway 71 having an aperture 72 which continues communication between the chamber 70 and the line 69.

Although the disclosed embodiment of the invention involves detection of a split curl in a central annular curl of an aerosol can end, the invention is useful in detecting a split curl including any arcuate portion having a fissure therein and located in any position on a closure.

It should also be appreciated that the invention may be used in a number of detecting systems more elaborate than the simplified illustrative system of FIG. 5. For example, it may be desirable to have a pneumatic switch actuate a time delay which will in turn actuate means for separating good ends from defective ends. These means might include a solenoid operating in conjunction with a trapdoor in an end-transporting chute leading away from the head 24, which trapdoor is opened at the precise moment an end having a split curl is passing over it.

Although a specific embodiment of the invention has been disclosed and various alternatives suggested, it should be appreciated that many modifications may be made without departing from the spirit and scope of this invention.

What is claimed as new and desired to be secured by Letters Patent of the United States is:

1. A method of detecting a fissure in an outwardly and downwardly extending curl on an aerosol can closure comprising:
    engaging a substantially round portion of the curl with a first arcuate sealing member and forming a continuous arcuate seal therealong;
    engaging the curl below and outwardly of the crest of the curl with a second arcuate sealing member, the fissure in the curl producing an out-of-round condition of a portion of the curl with consequent leakage gaps between the second arcuate sealing member and a round portion of the curl below and outwardly of the curl crest in addition to leakage through the fissure of the curl;
    introducing fluid to a chamber defined at least in part by the first sealing member, the second sealing member, and the curl engaged thereby; and
    detecting leakage of the fluid from the chamber through the leakage gaps.

2. The method as recited in claim 1 wherein the curl is engaged below and outwardly of the curl crest by a substantially rigid second sealing member.

3. The method of detecting a fissure in an outwardly and downwardly extending curl of an aerosol can closure comprising the following ordered steps:
    engaging a round portion of the curl with a first sealing member and an out-of-round portion of the curl produced by the fissure outwardly of and below the curl crest with a second sealing member;
    applying fluid to a chamber defined at least in part by the first sealing member, the second sealing member, and the curl in response to movement of the first sealing member and the second sealing member; and
    detecting leakage of the fluid from the chamber along the curl through leakage gaps between the second sealing member and the out-of-round portion of the curl and the leakage gaps being formed in addition to any leakage gap formed at the fissure.

4. The method as recited in claim 3 wherein the first sealing member engages the crest of the curl.

5. The method as recited in claim 4 wherein the first sealing member engages the crest of the curl before the second sealing member engages the side of the curl.

6. Apparatus for use in detecting a fissure in an aerosol can closure and comprising:
    a housing means;
    a pair of sealing members for engaging the closure to form a chamber defined by said pair of sealing members and the closure, said pair of sealing members being relatively movable with respect to said housing, one of said sealing members adapted to engage the curl of the closure below and outwardly of the curl crest such that the out-of-round condition of a portion of the curl produced by said fissure will result in leakage gaps between said one of said sealing members and said curl in addition to any leakage gap at said fissure; and
    fluid coupling means including valve means communicating with the chamber for supplying fluid thereto, said valve means being responsive to the relative movement of one of said sealing members with respect to said housing.

7. The apparatus as recited in claim 6 wherein said pair of sealing members are mutually relatively movable.

8. The apparatus as recited in claim 7, wherein said valve means is also responsive to the mutual relative movement of said pair of sealing members.

9. Apparatus for detecting a split curl in a closure comprising:
    a central member having a central sealing surface for engaging the crest of the curl;
    a peripheral member having a peripheral sealing surface for engaging the curl beneath the crest and above the edge, said central member and said peripheral member forming a chamber when concurrently engaging the curl;
    a housing enclosing said central member and said peripheral member, said central member and said peripheral member being relatively axially movable with respect to said housing; and
    fluid coupling means including valve means communicating with the chamber for supplying fluid thereto, said valve means being responsive to the relative movement of said central member and said peripheral member with respect to said housing.

10. The apparatus as recited in claim 11 wherein said central sealing surface is relatively movable with respect to said peripheral sealing surface and said valve means is responsive to the relative movement therebetween.

11. An apparatus for use in detecting a leak in a closure comprising:
an outer housing member including fluid coupling means;
a central member positioned within and movable with respect to said housing member including a central sealing surface for engaging the closure;
a sleeve positioned between said outer housing member and said central member and movable with respect to said housing member and said central member, said sleeve including a peripheral sealing surface for engaging the closure and including valve means associated with the fluid coupling means and controlled by movement of the sleeve with respect to said housing, said valve means controlling the introduction of fluid to the chamber formed when the closure is engaged by said central sealing surface and said peripheral sealing surface.

12. The apparatus as recited in claim 11 wherein said valve means includes a passageway through said sleeve communicating between said fluid coupling means and the chamber.

13. The apparatus as recited in claim 12 wherein said sleeve and said central member are spring biased to an extended forward position within said housing prior to engagement of the closure by said central sealing surface.

14. The apparatus as recited in claim 13 wherein said central member includes alignment means for engaging the central portion of the closure.

References Cited

UNITED STATES PATENTS

| | | | |
|---|---|---|---|
| 3,247,707 | 4/1966 | Tatro | 73—49.2 |
| 2,696,107 | 12/1954 | Blaing-Leisk | 73—45.2 |

S. CLEMENT SWISHER, Primary Examiner

W. A. HENRY II, Assistant Examiner

U. S. PATENT OFFICE

UNITED STATES PATENT OFFICE

CERTIFICATE OF CORRECTION

Patent No. 3,520,178                    Dated July 14, 1970

Jerry F. Scharf

It is certified that error appears in the above-identified patent and that said Letters Patent are hereby corrected as shown below:

Column 2, line 28, omit "outwardly of and below the crest of the curl".

Column 2, line 32, insert after "curl" --outwardly of and below the crest of the curl--

Column 6, line 72, change "claim 11" to --claim 9--.

Edward M. Fletcher, Jr.
Attesting Officer

WILLIAM E. SCHUYLER, JR.
Commissioner of Patents